United States Patent
Eguchi et al.

[11] Patent Number: 6,009,240
[45] Date of Patent: Dec. 28, 1999

[54] ELECTRONIC WHITE-BOARD EQUIPMENT AND ELECTRONIC WHITE-BOARD SYSTEM

[75] Inventors: Kazuhiro Eguchi; Osamu Nakamura, both of Kasuga, Japan

[73] Assignee: Matsushita Electric Industrial Co., Ltd., Japan

[21] Appl. No.: 08/978,279

[22] Filed: Nov. 25, 1997

[30] Foreign Application Priority Data

Nov. 25, 1996 [JP] Japan .................................. 8-313263

[51] Int. Cl.$^6$ .................................................. G06K 15/00
[52] U.S. Cl. ........................................ 395/106; 395/101
[58] Field of Search .................................. 395/101, 106, 395/102, 112, 114; 382/298, 299, 312; 358/471, 474; 345/156, 159

[56] References Cited

U.S. PATENT DOCUMENTS 5,021,892  6/1991  Kita et al. ................................ 358/468

FOREIGN PATENT DOCUMENTS 0 012 793 A3  7/1980  European Pat. Off. ............... 395/102
2-12420  1/1990  Japan .

*Primary Examiner*—Arthur G. Evans
*Attorney, Agent, or Firm*—Parkhurst & Wendel, L.L.P

[57] ABSTRACT

An electronic white-board apparatus having a writable screen, a reader for reading information on a screen and outputting the information as image data, a printer for printing and recording the image data output from the reader onto a recording medium, and an external interface which is connectable to external equipment and can output the image data from the reader. Data obtained by reading information on the screen can be output to external information equipment such as personal computers for editing purposes. Information written on a screen (1) is read by a CCD (9), and stored in an image memory (13) through an A/D converter (10), magnification and reduction circuit (11), and binarizer (12). A CPU (14) determines whether a laser printer (18) or personal computer (20) is connected to a parallel interface connector (17). If one of them is connected, data stored in the image memory (13) is output to the laser printer (18) or personal computer (20). If none of them is connected, the data in the image memory (13) is output to a thermal printer (16).

7 Claims, 6 Drawing Sheets

ELECTRONIC WHITE-BOARD EQUIPMENT AND ELECTRONIC WHITE-BOARD SYSTEM

FIELD OF THE INVENTION

The present invention relates to the field of electronic white-board equipment and electronic white-board systems which can output information written on a screen by connecting the electronic white-board equipment to equipment such as external printers and personal computers.

BACKGROUND OF THE INVENTION

One type of electronic white-board equipment of the prior art which can be connected to external equipment is disclosed in Japanese Laid-Open Patent No. H2-12420. That document discloses that information written on a screen can be read and output to information equipment by connecting information equipment, such as a computer, to the electronic white-board equipment.

The prior art, however, discloses only the idea of simply connecting electronic white-board equipment to information equipment, and thus a range of problems remain to be solved for realizing such a system.

SUMMARY OF THE INVENTION

The present invention is directed to electronic white-board equipment and an electronic white-board system with extensibility and good operability.

The electronic white-board equipment of the present invention comprises a writable screen, a reader for reading information written on a screen and outputting it as image data, a printer for printing and recording the output data from the reader onto a recording medium, and an external interface which is connectable to external equipment and can output the output data from the reader.

The electronic white-board equipment of the present invention improves extensibility of the electronic white-board equipment by employing a controller for switching output destinations of the output data from the reader between a built-in printer and external interface. In addition, external equipment such as laser printers and personal computers can be connected to the electronic white-board equipment through the external interface.

The present invention according to a first embodiment is electronic white-board equipment which comprises a writable screen, a reader for reading information on a screen and outputting it as image data, an external interface which is connectable to external equipment and can output the output data from the reader, a printer for printing and recording the output data from the reader onto a recording medium, and a controller for switching output destinations of the output data from the reader between the printer and external interface. With this configuration, image data obtained by reading an image on the electronic white-board equipment with the reader can be output to external equipment such as laser printers and personal computers which are selectively connected through the external interface.

The present invention according to a second embodiment employs a controller which determines whether external equipment is connected to the external interface, and outputs the data from the reader to the external interface if the external equipment is connected. With this configuration, output of the image data stored in the reader to the external equipment through the external interface is given priority if the external equipment is connected.

The present invention according to a third embodiment employs a controller which determines whether external equipment is connected to the external interface, and the reader reads an image in high resolution if the external equipment is connected. With this configuration, the reader reads an image in high resolution suitable for the external equipment if the external equipment is connected to the external interface.

The present invention according to a fourth embodiment employs a controller which determines whether external equipment is connected to the external interface, and the reader reads an image in low resolution if the external equipment is not connected. With this configuration, the reader can read an image in low resolution which is sufficient for the printer of the electronic white-board if the external equipment is not connected to the external interface.

The present invention according to a fifth embodiment is electronic white-board apparatus which comprises a writable screen, a reader for reading information written on a screen and outputting it as image data, an external interface which is connectable to external equipment and can output the output data from the reader, and a controller for setting reading conditions of the reader depending on a type of external equipment connected to the external interface. With this configuration, reading conditions suitable for the type of external equipment are settable to the reader if the external equipment is connected to the external interface.

The present invention according to a sixth embodiment employs a controller which sets the reading resolution of the reader depending on a type of the external equipment connected to the external interface. With this configuration, the reading resolution suitable for the external equipment is settable to the reader if the external equipment is connected to the external interface.

The present invention according to a seventh embodiment is electronic white-board equipment which comprises a writable screen, a reader for reading information written on a screen and outputting it as image data, an external interface which is connectable to external equipment and can output the output data from the reader, and a controller for setting reading conditions of the reader depending on a type of external equipment connected to the external interface and switching an output destination of image data read by the reader based on the set reading conditions from the printer to external interface. With this configuration, the reading conditions in the reader are set to a resolution suitable for external equipment if it is connected to the external interface, and output of the read image data to the external equipment through external interface is given priority.

The present invention according to an eighth embodiment is an electronic white-board system comprising electronic white-board equipment and a computer terminal connected thereto. The electronic white-board equipment comprises a writable screen, a reader for reading information written on a screen, and a printer for printing and recording the output data from the reader to a recording medium. The electronic white-board equipment employs a controller for determining connection between the electronic white-board equipment and the computer terminal, and outputting the output data from the reader to the computer terminal based on a result of determination. The computer terminal comprises a storage device for storing the data output from the electronic white-board equipment and a display monitor for displaying the data stored in the storage device. With this configuration, image data read by the reader of the electronic white-board equipment can be stored in the storage device or displayed on the display monitor of the computer terminal connected to the electronic white-board equipment.

The present invention according to a ninth embodiment computer terminal further comprises a variable scaling designator for designating a vertical or horizontal scaling ratio of the output data stored in the storage device, and a controller for magnifying or reducing the output data stored in the storage device based on the scaling ratio specified by the variable scaling designator and displaying magnified or reduced data on the display monitor. With this configuration, the size of the image data can be changed on the computer terminal connected to the electronic white-board equipment.

DESCRIPTION OF THE PREFERRED EMBODIMENT

Figure 1:
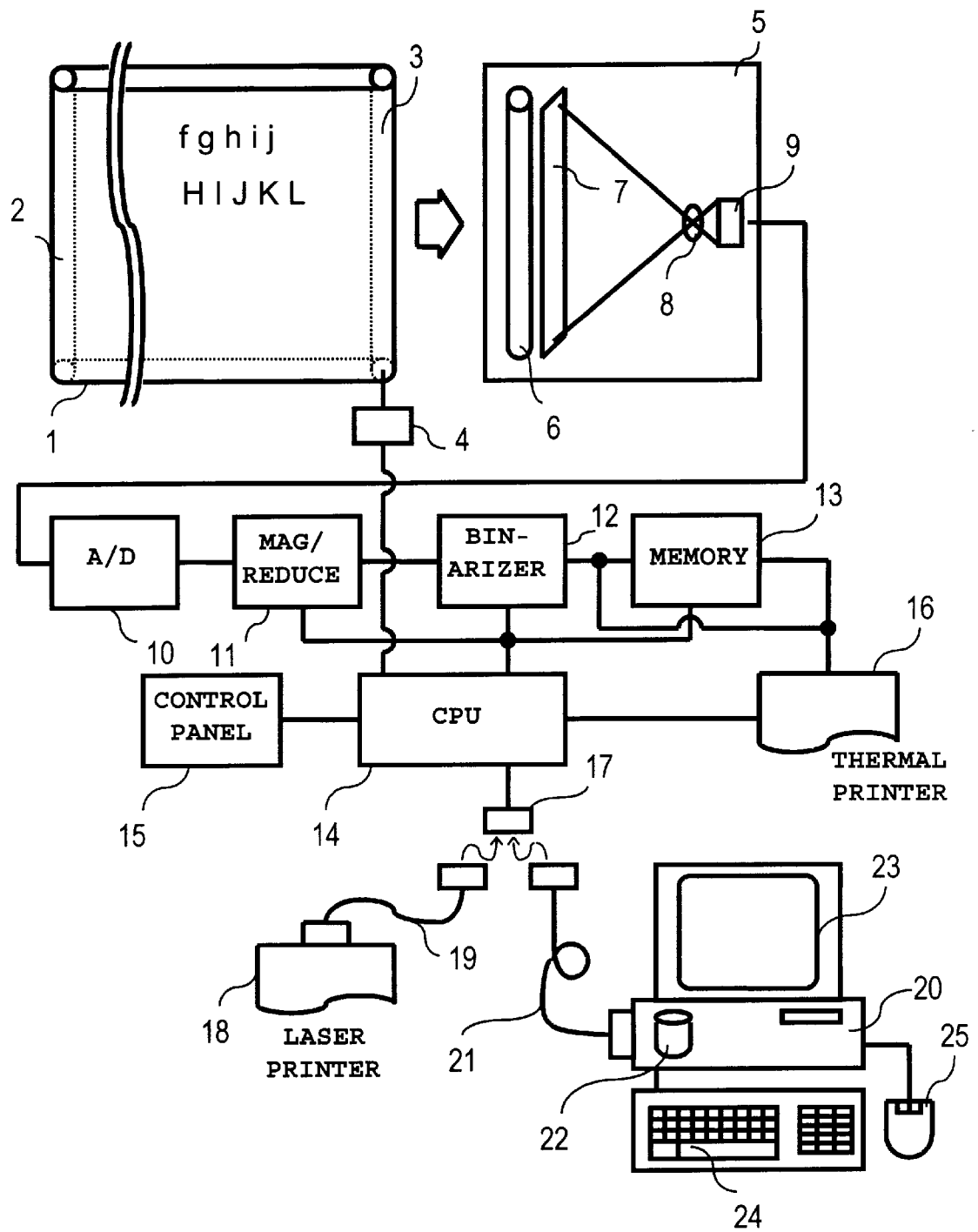
FIG. 1 is a block diagram of electronic white-board equipment and an electronic white-board system in accordance with a first exemplary embodiment of the present invention.

FIGS. 1 and 2 show a configuration of electronic white-board equipment and an electronic white-board system in an exemplary embodiment of the present invention. A writable screen 1 is cylindrically supported by a screen roller 2 at one side, and a screen driving roller 3 cylindrically supports the screen 1 at the other side. A screen driving motor 4 is attached to the screen driving roller 3 and the screen 1 is movable by rotating the screen driving roller 3.

The way in which the reading section reads information written on the screen 1 and outputs it as image data is explained next. An optical reader 5 attachable to the screen 1 comprises a fluorescent lamp 6 for illuminating the surface of the screen 1, a mirror 7 for reflecting the light reflected on the screen 1 through 90°, a lens 8 for focusing the light reflected by the mirror 7 on a CCD 9 (explained next), and a CCD 9 for converting the intensity of the light to an analog voltage level.

The analog voltage output from the CCD 9 is converted to an 8-bit digital signal by an A/D converter 10. A magnification and reduction circuit 11 converts the 8-bit digital signal output from the A/D converter 10, the original image, to a digital signal corresponding to an image magnified or reduced based on the desired scaling ratio. A binarizer 12 converts the 8-bit digital signal to a binary signal comprising "0s" and "1s" in accordance with a specified threshold level.

An image memory 13 stores the image data received and converted to the binary signal by the binarizer 12. A CPU 14 controls the entire operation. A control panel 15 is connected to the CPU 14. A thermal printer 16 prints the image data converted to the binary signal by the binarizer 12 or the image data stored in the image memory 13 according to instructions from the CPU 14.

A parallel interface connector 17 is used for communicating with external equipment under the control of the CPU 14. As described later, a laser printer or personal computer is connected to the parallel interface connector 17 by a cable. A laser printer 18 is connected to the parallel interface connector 17 by a printer cable 19, and is controllable by the CPU 14. A personal computer (hereinafter referred to as a PC) 20 is connected to the parallel interface connector 17 by a parallel interface cable 21 for communications. A storage monitor 22, CRT display device (hereinafter referred to as a CRT) 23, keyboard 24, and mouse 25 are connected to the PC 20.

Figure 3:
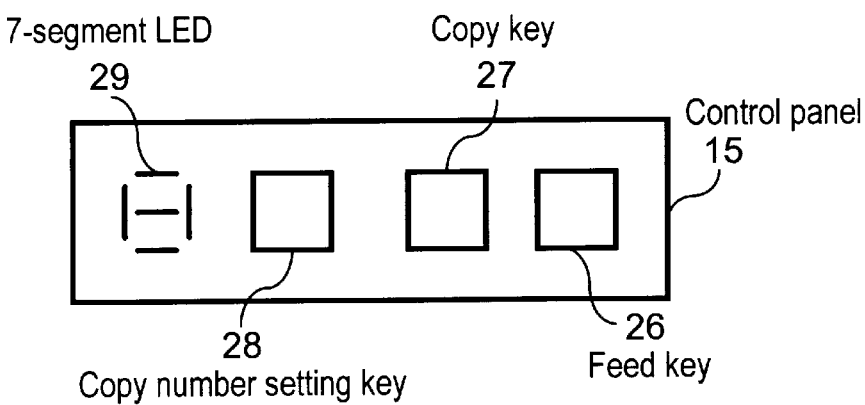
FIG. 3 is a configuration of a control panel of the electronic white-board equipment in accordance with the exemplary embodiment of the present invention.

As shown in FIG. 3, the control panel 15 comprises a feed key 26, copy key 27, copy number setting key 28, and 7-segment LED 29. The feed key 26 is used for moving the screen, the copy key 27 is used for reading images on the screen and outputting them to the PC 20, laser printer 18, or thermal printer 16. The copy number setting key 28 is used for setting the number of copies to be printed by operating the copy key 27, and the LED 29 is used for displaying the present number of copies.

The operations for screen reading, output to the laser printer, output to the PC, and output to the thermal printer are explained next.

Screen Reading

When an operator operates the copy key 27 on the control panel 15 (FIG. 3), the written face of the screen 1 starts to move toward the optical reader 5 via the rotation of the screen driving roller 3. Reflection of the light irradiated from the fluorescent lamp 6 to the screen 1 is reflected by the mirror 7, and the lens 8 focuses it on the CCD 9 for detecting the light as image data. The A/D converter 10 converts the image data to an 8-bit digital signal. The 8-bit digital signal goes through the magnification and reduction circuit 11, and the binarizer 12 then converts it to the binary digital signal. The binary digital signal is stored in the image memory 13.

Reading resolution is variable by the magnification and reduction circuit 11 and the rotation speed of the screen driving motor 4. The image data stored in the image memory 13 is output to one of the following: the laser printer 18, PC 20, or thermal printer 16.

Output to the Laser Printer

When the laser printer 18 is connected to the parallel interface connector 17 through the printer cable 19, the CPU 14 outputs the image data stored in the image memory 13 to the laser printer 18 for printing. Whether the laser printer 18 is connected to the parallel interface connector 17 is determined by, for example in the case of the Centronics interface specification generally adopted in many laser printers, the select signal transmitted from the laser printer 18 to the CPU 14 through the parallel interface connector 17. The select signal indicates the online state of the laser printer. The CPU 14 can determine whether the laser printer 18 is connected based on the presence of the select signal.

Output to the PC

When the PC 20 is connected to the parallel interface connector 17 through the parallel interface cable 21, the CPU 14 outputs the image data stored in the image memory 13 to the PC 20, and the PC 20 stores the received image data in the storage device 22. At the same time, the image data is displayed on the CRT 23. Whether the PC 20 is connected to the parallel interface connector 17 is determined by exchanging data between the CPU 14 and PC 20 through the parallel interface connector 17 for identifying the image data receivable state of the PC 20.

Output to the Thermal Printer

When no external equipment such as the laser printer 18 and PC 20 is connected to the parallel interface connector 17, the CPU 14 outputs the image data stored in the image memory 13 to the thermal printer 16 for printing.

Figure 2A:
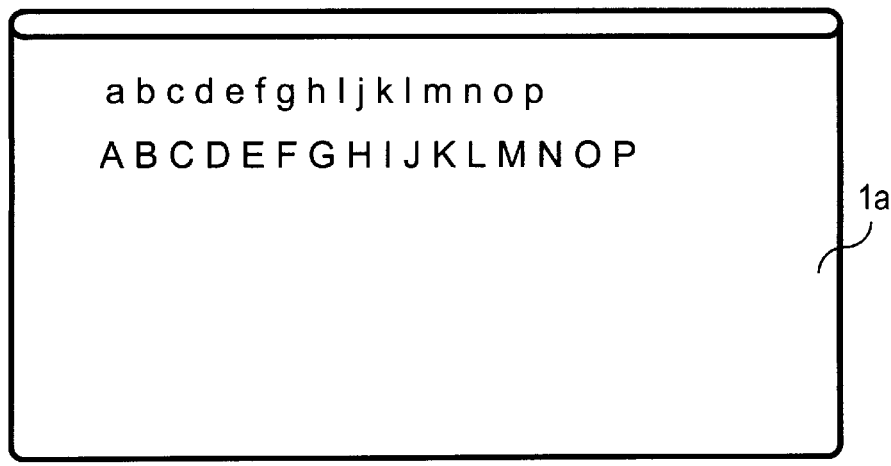
FIGS. 2A and 2B are explanatory views of a screen of the electronic white-board equipment in accordance with the exemplary embodiment of the present invention.
Figure 2B:
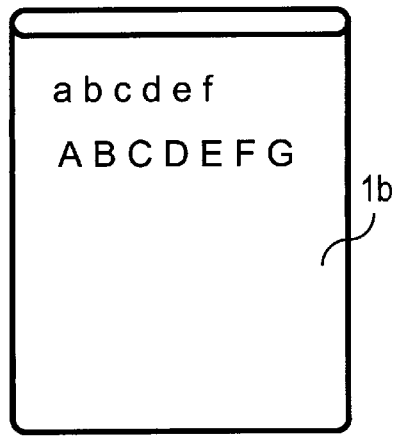

FIGS. 2A and 2B show screens 1a and 1b with different widths. FIG. 2A shows a screen 1a with a horizontal oblong shape and FIG. 2B shows a screen 1b with a vertical oblong shape.

Processes of the electronic white-board system in this exemplary embodiment as configured above are explained in detail with reference to flow charts.

1. Copying the Electronic White-board

Figure 4:
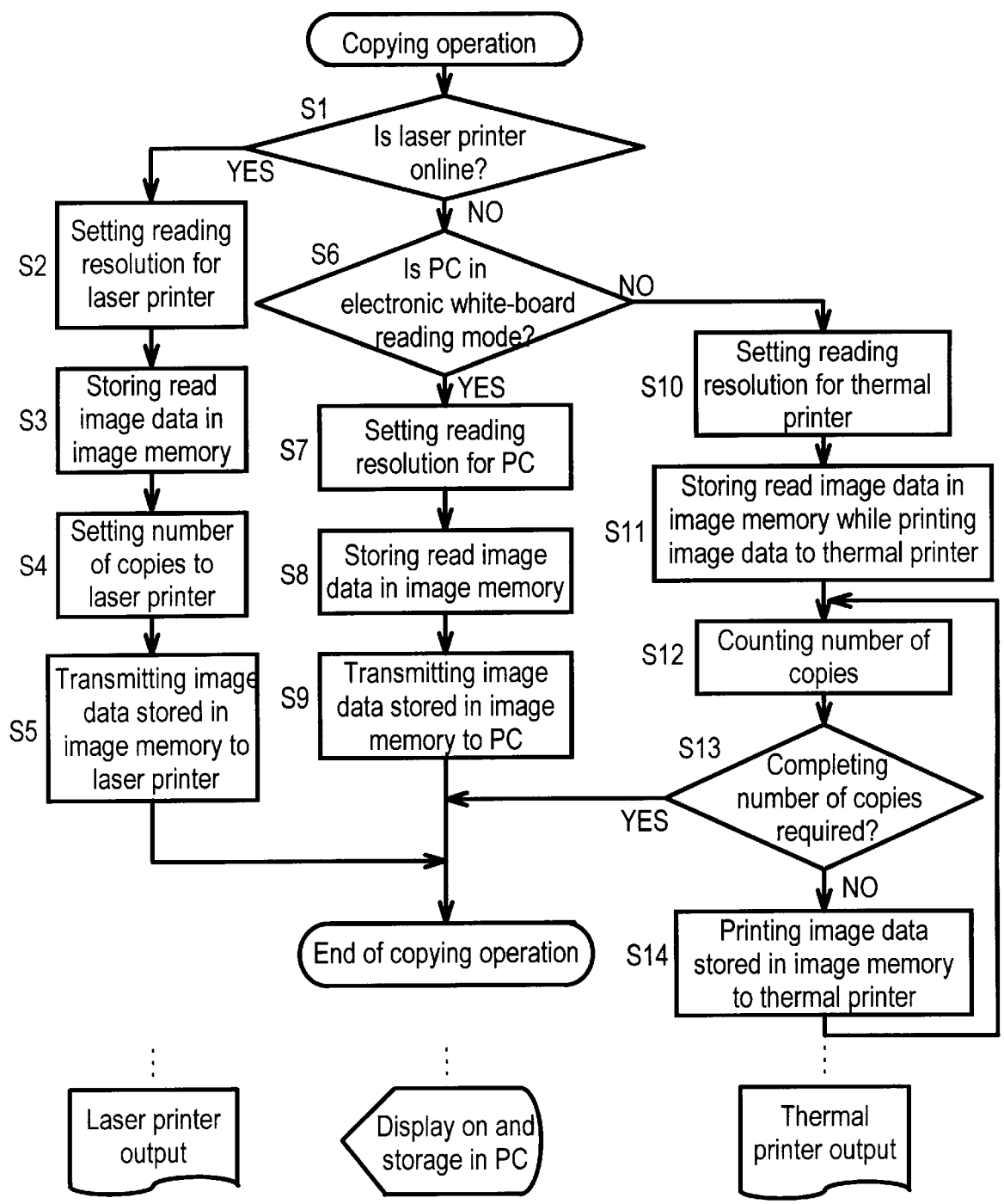
FIG. 4 is a flow chart illustrating a copying operation of the electronic white-board equipment in accordance with the exemplary embodiment of the present invention.

FIG. 4 shows a flow chart of the operation when an operator presses the copy key 27 on the control panel 15. The CPU 14 determines the online state referring to the select signal transmitted from the laser printer 18 through the parallel interface connector 17 when the operator presses the copy key 27 (S1). If the laser printer 18 is online, the CPU 14 sets the reading resolution optimally for the laser printer 18 (S2). The CPU 14 then drives the screen driving motor 4, turns on the fluorescent lamp 6 while the screen 1 is moving for reading the image written on the screen 1 by the CCD 9, and stores the read image data in the image memory 13 (S3). The CPU 14 also sets the number of copies preset by the operator using the copy number setting key 28 on the control panel 15 (FIG. 3) to the laser printer 18 (S4) The CPU 14 finally transmits the image data stored in the image memory 13 to the laser printer 18 and gives instructions for printing the image written on the screen 1 using the laser printer 18 (S5).

If the CPU 14 does not detect the select signal and determines that the laser printer 18 is offline (S1), the CPU 14 transmits the state confirming data to the PC 20 through the parallel interface connector 17 for checking the state of the PC 20. If there is a response to this data from the PC 20 to the CPU 14, the CPU 14 determines that the PC 20 is ready for receiving image data. The state where the PC 20 is ready for receiving image data is defined as the electronic white-board reading mode, and the PC 20 is set to respond to the state confirmation data from the CPU 14 only in the electronic white-board reading mode. The CPU 14 can thus determine that the PC is in the electronic white-board reading mode (S6).

If the PC 20 is in the electronic white-board reading mode, the CPU 14 sets the reading resolution optimally for the PC 20 (S7), reads the image on the screen 1 in the same way as S3 (S8), and stores the image data in the image memory 13. The CPU 14 then transmits the image data stored in the image memory 13 to the PC 20 (S9). The image on the screen 1 is stored in the storage device 22 connected to the PC 20 and, at the same time, displayed on the CRT 23. Here, the number of copies set by the operator using the copy number setting key 28 is ignored, and only one page full of image data is transmitted to the PC 20.

If the CPU 14 determines that the PC 20 is not in the electronic white-board reading mode because there is no response from the PC to the state confirmation data transmitted from the CPU 14 (S6), the CPU 14 sets the reading resolution optimally for the thermal printer 16 (S10). The image data of the image on the screen 1 is transmitted to the thermal printer 16 and, at the same time, stored in the image memory 13 (S11). The thermal printer 16 receives the image data and other information including the number of copies, and prints the image data. The CPU 14 counts the number of copies set by the operator using the copy number setting key 28 (S12), and determines whether printing of the number of copies set with the copy number setting key 28 is completed (S13). If the set number of copies is not completed yet, the CPU 14 continues to transmit the image data stored in the image memory 13 to the thermal printer 16, and the thermal printer 16 also continues printing (S14). The number of copies is then counted again, returning to S12. By repeating steps S12 to S14, the image data is printed for the number of copies set with the copy number setting key 28.

2. Electronic White-board Reading Mode

Figure 5:
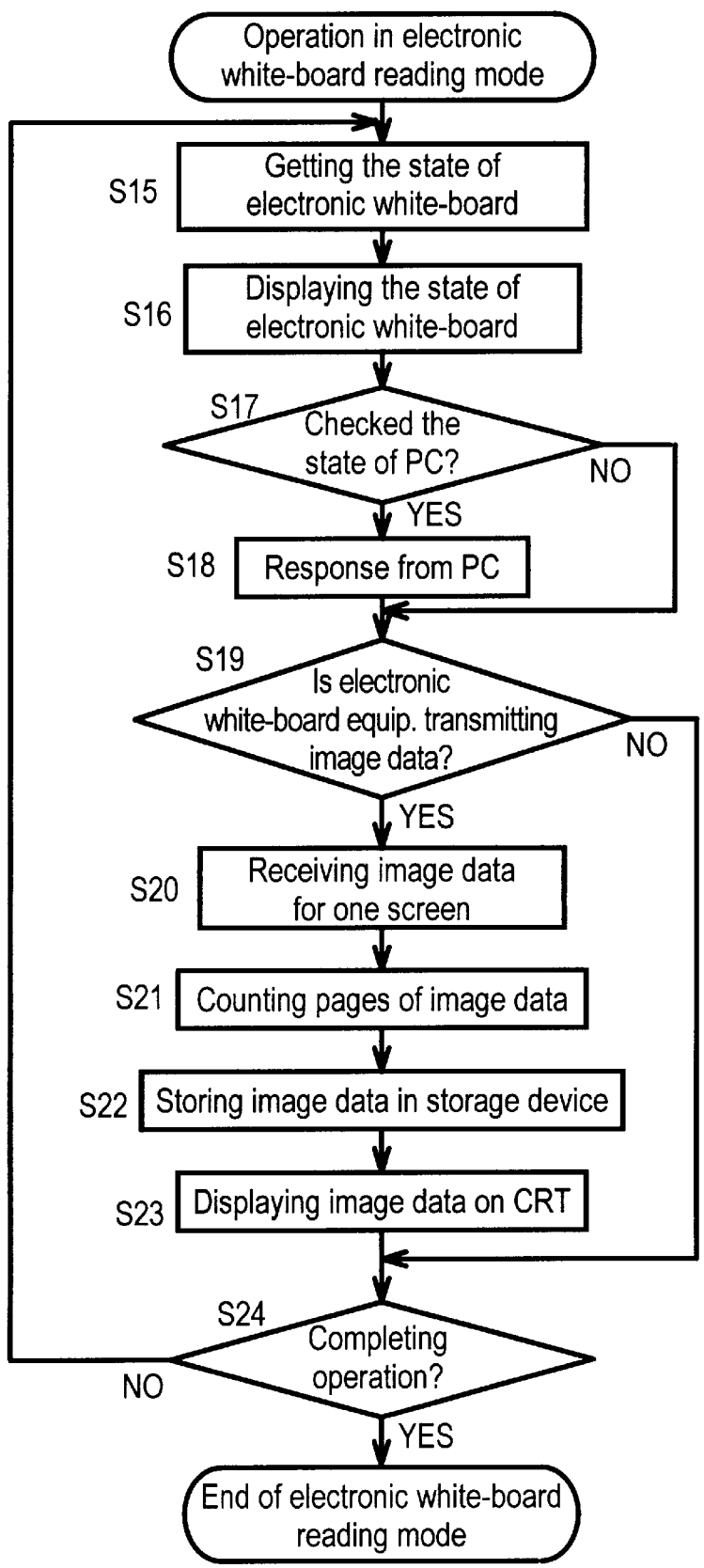
FIG. 5 is a flow chart illustrating an image reading operation in a PC of the electronic white-board system in accordance with the exemplary embodiment of the present invention.

FIG. 5 shows a flow chart illustrating the operation when the PC 20 is set to the electronic white-board reading mode using the keyboard 24 or mouse 25 in which image data from the electronic white-board equipment is receivable. When the PC 20 is set to the electronic white-board reading mode, the PC 20 transmits data for inquiring the state of the electronic white-board to the CPU 14 through the parallel interface connector 17 and receives a response from the electronic white-board equipment for checking the state of the electronic white-board equipment (S15).

The following states of the electronic white-board are identifiable by the PC 20:

Power off state, which means no response;

Ready state, which means there is no on-going processing;

Busy state, which means there is on-going processing; and

Error state, which means occurrence of abnormality.

The above states of the electronic white-board equipment are displayed on the CRT 23 (S16).

Next, the PC 20 determines whether there is the state confirmation data for checking the state of the PC 20 being transmitted from the CPU 14 (S17). If there is the state confirmation data, the PC 20 transmits a response to the CPU 14 to indicate that the PC 20 is in the electronic white-board reading mode (S18). The PC 20 then determines whether transmission of image data from the CPU 14 of the electronic white-board equipment has started (S19). If transmission of image data has started, the PC 20 receives the image data for one screen (S20), and counts which page is represented by the image data received for that screen (S21). The storage device 22 stores the image data received (S22) and, at the same time, the CRT 23 displays the image data received (S23).

Finally, the CPU 14 determines whether the electronic white-board reading mode is completed by the operator using the keyboard 24 or mouse 25 (S24). The above operations from S15 to S24 are repeated until the electronic white-board reading mode is completed. In this way, the PC 20 can receive consecutive multiple image data and store them in the storage device 22.

3. Image Data Display

Figure 6A:
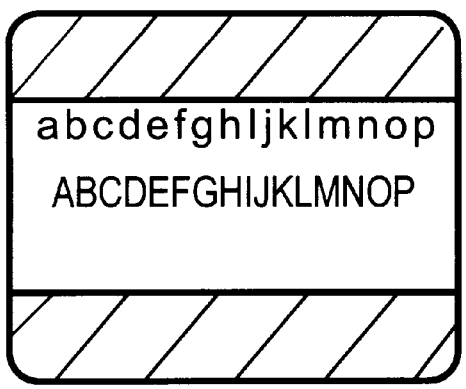
FIGS. 6A to 6D are examples of displays on a PC in the electronic white-board system in accordance with the exemplary embodiment of the present invention.
Figure 6B:
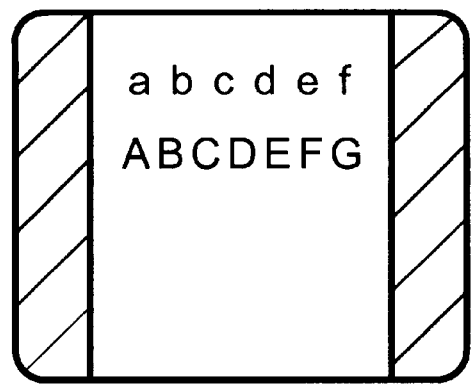
Figure 6C:
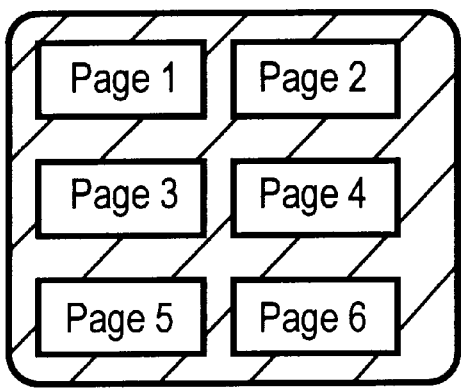
Figure 6D:
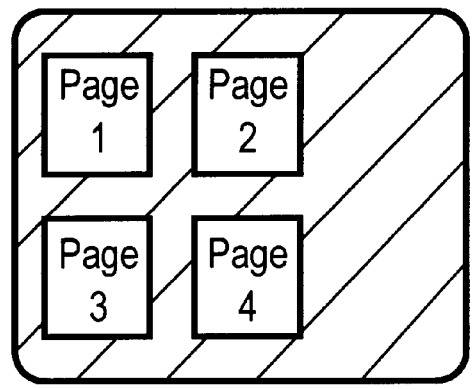

FIGS. 6A to 6D show examples of image data, read from the electronic white-board, displayed on the CRT 23 of the PC 20. FIG. 6A shows a one-page display screen of data read from the horizontal oblong screen 1a, FIG. 6B shows a one-page display screen of data read from the vertical oblong screen 1b, FIG. 6C shows a catalog display screen in which the size of image data read from the horizontal oblong screen 1a is reduced for simultaneous display of multiple pages of the image data on the screen, and FIG. 6D shows a catalog display screen in which the size of image data read from the vertical oblong screen 1b is reduced for simultaneous display of multiple pages of the image data on the screen.

Figure 7:
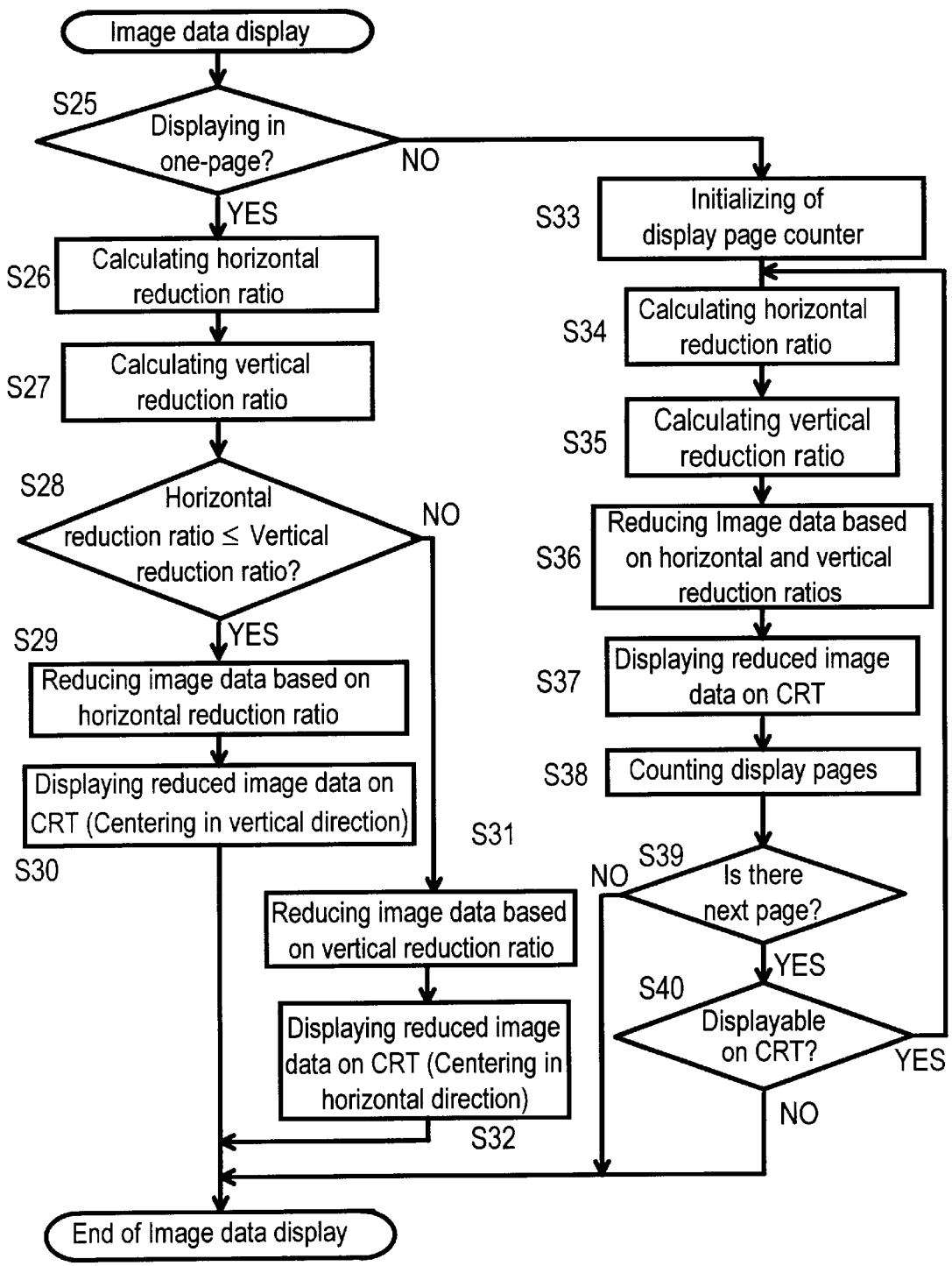
FIG. 7 is a flow chart illustrating image display processing in a PC in the electronic white-board system in accordance with the exemplary embodiment of the present invention.

FIG. 7 shows a flow chart illustrating the processing for displaying image data on the CRT 23. When the operator instructs to display the image data using the keyboard 24 or mouse 25, the PC 20 first determines whether the image to be displayed is a one-page display or a catalog display. For one-page display as shown in FIGS. 6A and FIG. 6B, the PC 20 calculates the horizontal reduction ratio for displaying the image data on the CRT 23 (S26).

The formula for calculating the horizontal reduction ratio is as follows:

(Horizontal reduction ratio for one-page display)=(Number of horizontal pixels on CRT)/(Number of horizontal pixels in image data).

Next, the vertical reduction ratio for displaying the image data on the CRT 23 is calculated in the same way (S27).

The formula for calculating the vertical reduction ratio is as follows:

(Vertical reduction ratio for one-page display)=(Number of vertical pixels on CRT)/(Number of vertical pixels in image data).

In the case of one-page display, the image data is displayed at maximum size on the CRT 23 using the same display scaling ratio for both horizontal and vertical directions. Therefore, the horizontal reduction ratio and vertical reduction ratio are compared after calculation in accordance with the above two formulae, and the image data is reduced using a smaller reduction ratio (S28).

For example, if the horizontal reduction ratio is smaller, the image data is reduced horizontally and vertically using the horizontal reduction ratio (S29), and reduced image data is displayed on the CRT 23 (S30). In this case, the number of horizontal pixels on the CRT and the number of horizontal pixels in the reduced image data conform in the horizontal direction, but the number of vertical pixels in the image data is smaller than the number of vertical pixels on the CRT in the vertical direction. The vertical display position on the CRT 23 is thus centered.

If the vertical reduction ratio is smaller (S28), the image data is horizontally and vertically reduced using the vertical reduction ratio (S31), and the reduced image data is displayed on the CRT 23 (S32). In this case, the number of vertical pixels on the CRT and the number of vertical pixels in the reduced image data conform in the vertical direction, but the number of horizontal pixels in image data is smaller than the number of horizontal pixels on the CRT in the horizontal direction. The horizontal display position on the CRT 23 is thus centered.

If it is not the one-page display in S25, the display page counter is initialized because the image data will be displayed in the catalog display (S33). The horizontal reduction ratio for displaying the image data in the catalog display size set by the user on the CRT 23 is calculated (S34).

The formula for calculating the horizontal reduction ratio is as follows:

(Horizontal reduction ratio for catalog display)=(Number of horizontal pixels in catalog display)/(Number of horizontal pixels in image data).

In the same way, the vertical reduction ratio for displaying the image data in a catalog display size set by the user on the CRT 23 is calculated (S35):

The formula for calculating the vertical reduction ratio is as follows:

(Vertical reduction ratio for catalog display)=(Number of vertical pixels in catalog display)/(Number of vertical pixels in image data).

In the case of the catalog display, the image data is displayed on the CRT 23 in a catalog size independently set by the user for horizontal and vertical directions. Specifically, the image data is reduced using the horizontal reduction ratio for horizontal reduction, and the vertical reduction ratio for vertical reduction (S36). The reduced image data is displayed on the CRT 23 (S37). Here, the PC 20 intends to display the image data in a layout for displaying as much image data as possible on one screen based on the number of horizontal and vertical pixels in the reduced image data and the number of horizontal and vertical pixels on the CRT 23.

After completing the display of the first page of the catalog, the total number of catalog display pages is counted (S38), and the presence of the next page is checked (S39). If there is a next page, the PC 20 determines whether more pages are displayable on the CRT 23 (S40). If displayable, the next page is displayed in a catalog size, returning to S34.

As explained above, the aspect ratio of the image data is retained in the one-page display for displaying the image written on the screen 1 without spoiling the impression of the original image.

In the catalog display for simultaneous display of multiple pages of display data, the horizontal and vertical display size for one page can be separately set by the user, and thus many pages can be displayed on the CRT 23 at once by reducing the size of each page.

On the other hand, the display size of a page can be magnified to make each page of the image data easier to see.

Accordingly, in the catalog display, the user can freely set the size of the image data for optimum viewability without being dependent on the size of the CRT 23 or the shape of the electronic white-board screen.

Individual image data can be selected on the CRT 23 for storing that data separately from other data, or for pasting the selected data to documents created with other applications such as word processors.

4. OCR

The image data stored in the storage device 22 connected to the PC 20 is bit-map image data which can be used with other equipment including OCR and facsimile equipment.

As explained above, the present invention improves the extensibility of electronic white-board equipment by employing a controller for switching output destinations of data output from the reader between a built-in printer and external interface.

It will be appreciated that modifications may be made to the present invention. For example, serial interfaces such as USB can be used instead of the parallel interface. The present invention can also be applied to electronic white-board equipment in which the screen is fixed and not movable, and where the image sensor moves instead. The preferred embodiments described herein are therefore illustrative and not restrictive. The scope of the invention being indicated by the appended claims and all modifications which come within the true spirit of the claims are intended to be embraced therein.

What is claimed is:

1. An electronic white-board apparatus, comprising:
   a writable screen;
   reading means for reading information on said screen and for outputting the information as image data;
   printing means for printing onto a recording medium and recording the image data from said reading means;
   an external interface connected to said reading means; and
   control means for switching a destination of image data from said reading means between said printing means and said external interface.

2. The electronic white-board apparatus of claim 1, further comprising an image data viewing means, and said control means comprises means for determining whether said image data viewing means is connected to said external interface and for routing image data to said image data viewing means via said external interface.

3. The electronic white-board apparatus of claim 2, wherein said reading means comprises means for reading the information in a first resolution when said control means determines that image data viewing means is not connected to said external interface and for reading the information in a second resolution higher than said first resolution when said control means determines that an image data viewing means is connected to said external interface.

4. The electronic white-board apparatus of claim 2, wherein said control means comprises means for setting reading conditions for said reading means corresponding to different types of image data viewing means connected to said external interface.

5. The electronic white-board of claim 4, wherein said control means includes means for switching the destination of image data between said printing means and said external interface.

6. An electronic white-board system comprising an electronic white-board and a computer terminal connected thereto, said electronic white-board comprising:

a writable screen;

reading means for reading information on said screen;

printing means for printing and recording image data output from said reading means onto a recording medium; and control means for determining whether said white-board is connected to said computer terminal and for outputting the image data from said reading means to said computer terminal if said white-board is connected to said computer terminal; wherein said computer terminal comprises:

storage means for storing image data output from said reading means and display means for displaying the image data stored in said storage means.

7. An electronic white-board system as defined in claim 6, wherein said computer terminal further comprises:

scaling designation means for designating one of vertical scaling ratio and horizontal scaling ratio of the image data stored in said storage means; and control means for displaying the image data stored in said storage means on said display means in accordance with a scaling ratio designated by said scaling designation means.

* * * * *